(12) United States Patent
Kawanago et al.

(10) Patent No.: US 12,197,109 B2
(45) Date of Patent: Jan. 14, 2025

(54) LENS DEVICE AND IMAGING APPARATUS

(71) Applicant: FUJIFILM Corporation, Tokyo (JP)

(72) Inventors: Atsushi Kawanago, Saitama (JP);
Yasunobu Kishine, Saitama (JP);
Kazuyoshi Okada, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 169 days.

(21) Appl. No.: 18/063,658

(22) Filed: Dec. 8, 2022

(65) Prior Publication Data

US 2023/0106512 A1 Apr. 6, 2023

Related U.S. Application Data

(63) Continuation of application No. PCT/JP2021/024054, filed on Jun. 25, 2021.

(30) Foreign Application Priority Data

Jun. 30, 2020 (JP) .................. 2020-112266

(51) Int. Cl.
*G03B 15/06* (2021.01)
*G03B 11/00* (2021.01)
(Continued)

(52) U.S. Cl.
CPC .............. *G03B 15/06* (2013.01); *G03B 11/00* (2013.01); *H04N 23/55* (2023.01); *H04N 23/56* (2023.01)

(58) Field of Classification Search
None
See application file for complete search history.

(56) References Cited

U.S. PATENT DOCUMENTS 8,614,851 B2 * 12/2013 Kuster ................... G02B 21/22
359/376
9,658,463 B2 * 5/2017 Imamura ............ A61B 1/00096
(Continued)

FOREIGN PATENT DOCUMENTS

CN 101382648 B * 3/2011 ........... G02B 21/084
JP 2012058732 3/2012
(Continued)

OTHER PUBLICATIONS

English translation of CN-101382648-B, Wang, 2011 (Year: 2011).*
(Continued)

*Primary Examiner* — James M Hannett
(74) *Attorney, Agent, or Firm* — JCIPRNET

(57) ABSTRACT

A lens device and an imaging apparatus that can emit illumination light coaxial with a lens optical system are proposed herein. A lens device includes an optical system that includes a first lens and a second lens forming an optical image of a subject; a first optical member that includes a frame that includes a plurality of aperture regions, a plurality of optical filters that include two or more optical filters transmitting lights having at least some wavelength ranges different from each other, and a plurality of polarizing filters that have different polarization directions; and a second optical member that is provided outside the optical system and closer to a subject side than the first optical member and emits illumination light, which is incident from the outside of the optical system, to the subject side via the optical system.

13 Claims, 19 Drawing Sheets

(51) Int. Cl.
  *H04N 23/55* (2023.01)
  *H04N 23/56* (2023.01)

(56) References Cited

U.S. PATENT DOCUMENTS

| | | | |
|---|---|---|---|
| 10,247,866 B2* | 4/2019 | Yamagata | G02B 3/0006 |
| 10,307,045 B2 | 6/2019 | Morita | |
| 2007/0127024 A1* | 6/2007 | Nomura | G01J 4/04 |
| | | | 356/364 |
| 2009/0059397 A1* | 3/2009 | Igarashi | G03B 17/563 |
| | | | 359/818 |
| 2011/0316983 A1* | 12/2011 | Hiramoto | H04N 13/211 |
| | | | 348/E13.074 |
| 2014/0362200 A1* | 12/2014 | Kanamori | A61B 1/00186 |
| | | | 348/70 |
| 2015/0130962 A1* | 5/2015 | Hiramoto | H04N 23/125 |
| | | | 348/222.1 |
| 2019/0094702 A1* | 3/2019 | Shmarev | G03F 7/70683 |

FOREIGN PATENT DOCUMENTS

| | | | | |
|---|---|---|---|---|
| JP | 2017195569 | 10/2017 | | |
| WO | 2014020791 | 2/2014 | | |
| WO | WO-2016191367 A1 * | 12/2016 | ......... | G02B 26/023 |
| WO | 2017057270 | 4/2017 | | |

OTHER PUBLICATIONS

"International Search Report (Form PCT/ISA/210) of PCT/JP2021/024054," mailed on Sep. 7, 2021, with English translation thereof, pp. 1-5.

"Written Opinion of the International Searching Authority (Form PCT/ISA/237) of PCT/JP2021/024054," mailed on Sep. 7, 2021, with English translation thereof, pp. 1-6.

"Office Action of Japan Counterpart Application", issued on Feb. 5, 2024, with English translation thereof, p. 1-p. 6.

* cited by examiner

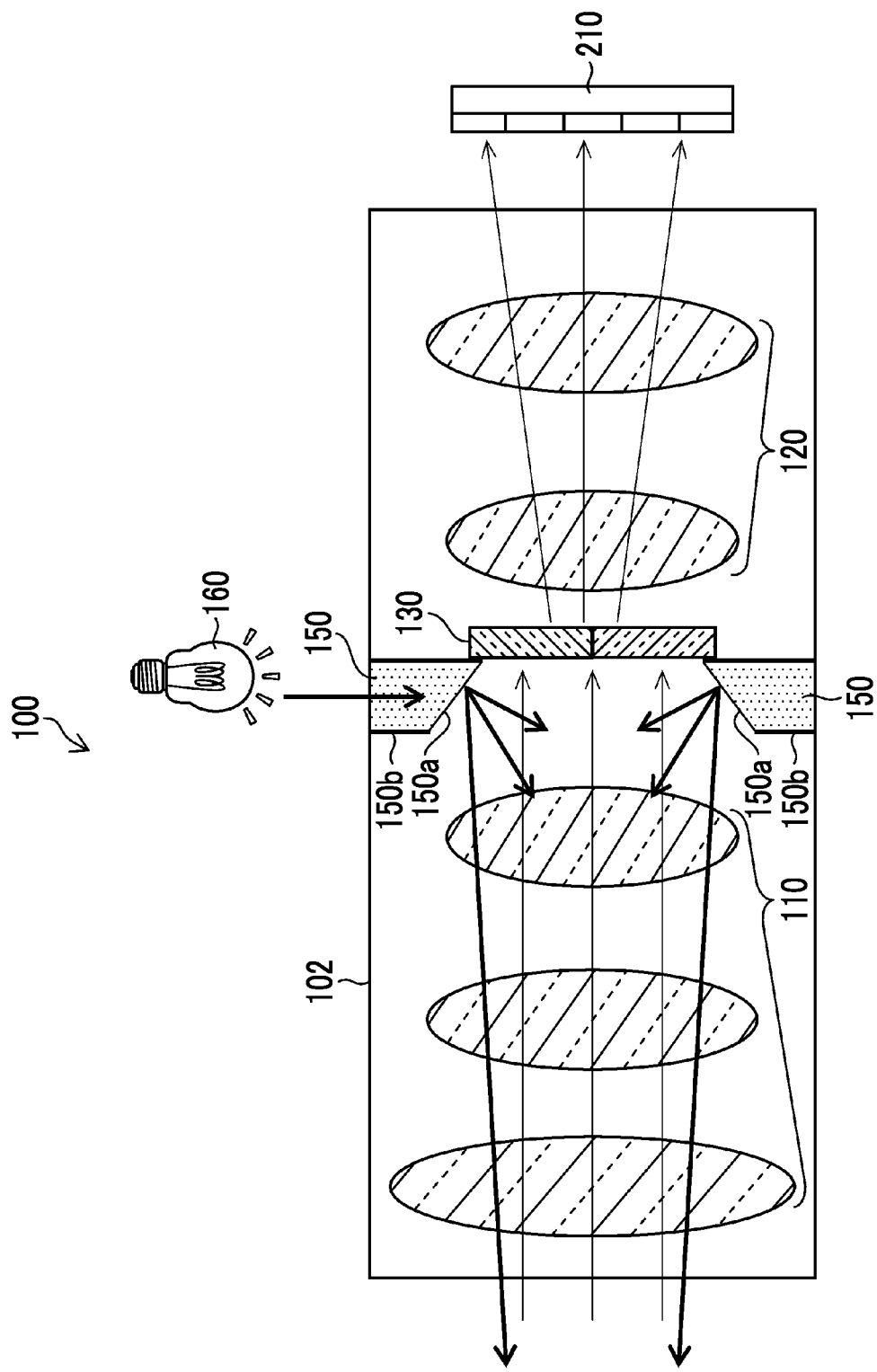

LENS DEVICE AND IMAGING APPARATUS

CROSS-REFERENCE TO RELATED APPLICATIONS

The present application is a Continuation of PCT International Application No. PCT/JP2021/024054 filed on Jun. 25, 2021 claiming priority under 35 U.S.C. § 119(a) to Japanese Patent Application No. 2020-112266 filed on Jun. 30, 2020. Each of the above applications is hereby expressly incorporated by reference, in its entirety, into the present application.

BACKGROUND OF THE INVENTION

1. Field of the Invention

The present invention relates to a lens device and an imaging apparatus that are used to capture multispectral images.

2. Description of the Related Art

With regard to a technique for capturing multispectral images, for example, WO2014/020791A discloses a polarization color imaging apparatus that can perform multispectral imaging by using a polarization sensor and pupil division.

SUMMARY OF THE INVENTION

One embodiment of a technique of the present disclosure provides a lens device and an imaging apparatus that can emit illumination light coaxial with a lens optical system.

A lens device according to a first aspect of the present invention comprises: an optical system that includes a lens forming an optical image of a subject; a first optical member that is disposed at a pupil position of the optical system or near the pupil position and includes a plurality of aperture regions, a plurality of optical filters that are disposed in the plurality of aperture regions and include two or more optical filters transmitting lights having at least some wavelength ranges different from each other, and a plurality of polarizing filters that are disposed in the plurality of aperture regions and have different polarization directions; and a second optical member that is provided outside the optical system and closer to a subject side than the first optical member and emits illumination light, which is incident from the outside of the optical system, to the subject side via the optical system.

According to a second aspect, in the lens device according to the first aspect, an end surface of the second optical member facing an optical axis of the optical system is inclined in a direction widening toward the subject side.

According to a third aspect, in the lens device according to the first aspect, an end surface of the second optical member facing an optical axis of the optical system has a curvature.

According to a fourth aspect, in the lens device according to any one of the first to third aspects, the second optical member is coaxial with an optical axis of the optical system and at least a part of the second optical member surrounds an outer periphery of the first optical member or a plurality of the second optical members are provided on a circumference about the optical axis.

According to a fifth aspect, in the lens device according to any one of the first to fourth aspects, the first optical member includes a frame that forms the plurality of aperture regions, and the second optical member is provided on the frame.

According to a sixth aspect, in the lens device according to any one of the first to fourth aspects, the second optical member is disposed from the first optical member with at least one or more lenses interposed therebetween.

According to a seventh aspect, the lens device according to any one of the first to sixth aspects further comprises an illumination device that emits the illumination light and the illumination light is emitted to the second optical member from the outside of the optical system.

According to an eighth aspect, in the lens device according to the seventh aspect, the illumination device is a ring illumination disposed outside the optical system, and illumination light emitted from the ring illumination is incident on the second optical member via a mirror.

According to a ninth aspect, the lens device according to any one of the first to sixth aspects further comprises an illumination device that emits the illumination light, and the illumination device is disposed in a lens barrel in which the optical system is disposed.

According to a tenth aspect, in the lens device according to the ninth aspect, the illumination device is provided on an optical path of the lens.

According to an eleventh aspect, in the lens device according to any one of the first to tenth aspects, a polarizer is provided on an end surface of the second optical member facing an optical axis of the optical system.

According to a twelfth aspect, in the lens device according to any one of the first to eleventh aspects, the second optical member is provided such that an inclination angle of the second optical member is changeable in a vertical direction and a lateral direction.

According to a thirteenth aspect, in the lens device according to any one of the first to twelfth aspects, the second optical member is a diffusion plate.

An imaging apparatus according to a fourteenth aspect of the present invention comprises: the lens device according to any one of the first to thirteenth aspects; an imaging element that includes a plurality of polarizing elements having different polarization directions and a plurality of pixel groups selectively receiving light transmitted through any one of the plurality of aperture regions; and a processor that generates a plurality of images corresponding to the wavelength ranges of the plurality of optical filters, respectively, on the basis of a plurality of image signals output from the imaging element.

BRIEF DESCRIPTION OF THE DRAWINGS

FIG. 9 is a diagram showing the schematic configuration of a lens device according to a first embodiment.

DESCRIPTION OF THE PREFERRED EMBODIMENTS

A lens device and an imaging apparatus according to preferred embodiments of the present invention will be described below with reference to the accompanying drawings.

<Configuration of Imaging Apparatus>

Figure 1:
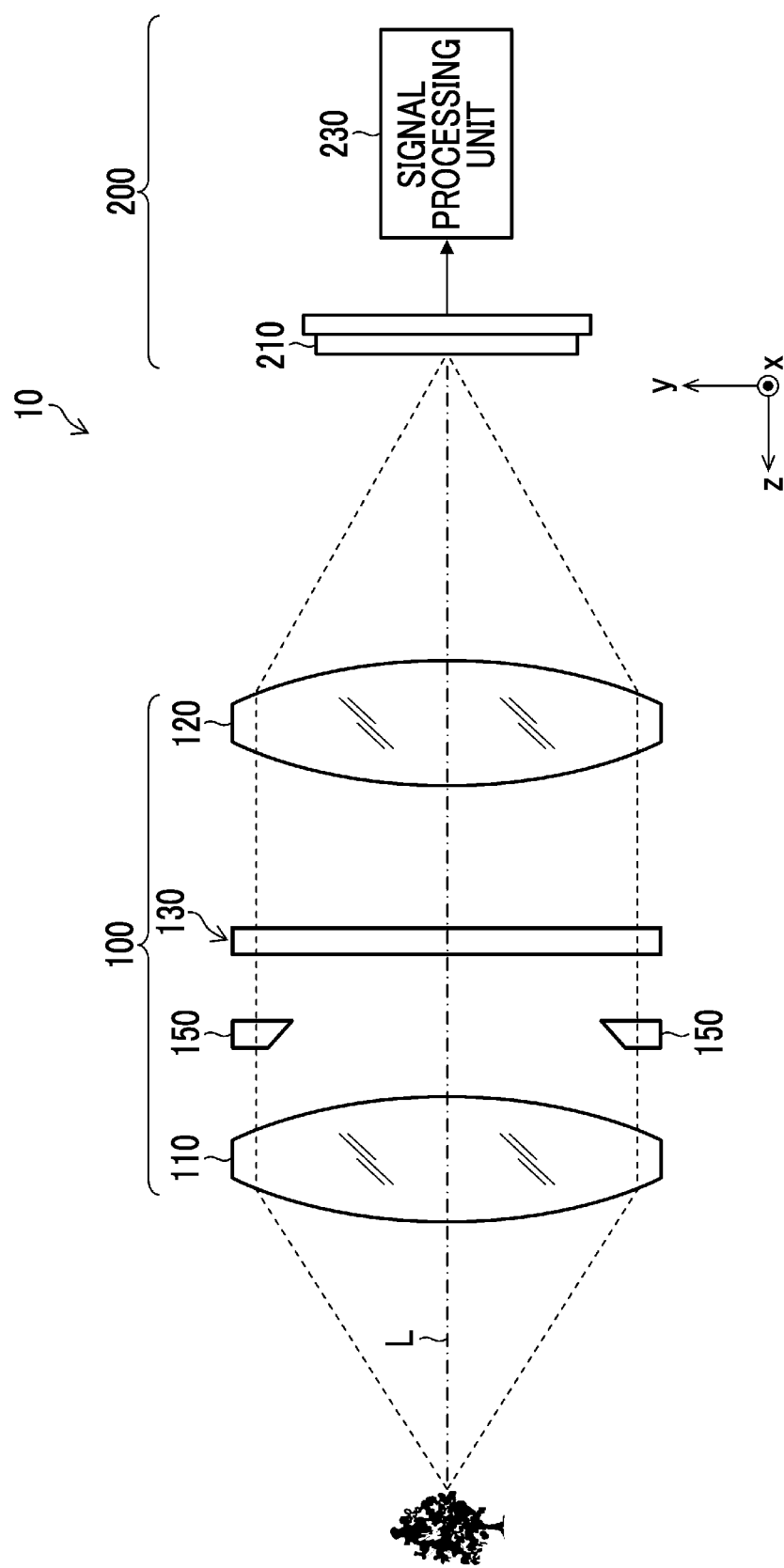
FIG. 1 is a diagram showing the schematic configuration of an imaging apparatus according to an embodiment of the present invention.

FIG. 1 is a diagram showing the schematic configuration of an imaging apparatus that comprises a lens device according to an embodiment of the present invention. The imaging apparatus 10 according to this embodiment is an imaging apparatus that captures a multispectral image, and mainly comprises a lens device 100 and an imaging apparatus body 200. The imaging apparatus body 200 comprises an imaging element 210 and a signal processing unit 230.

<Configuration of Imaging Element>

Figure 2:
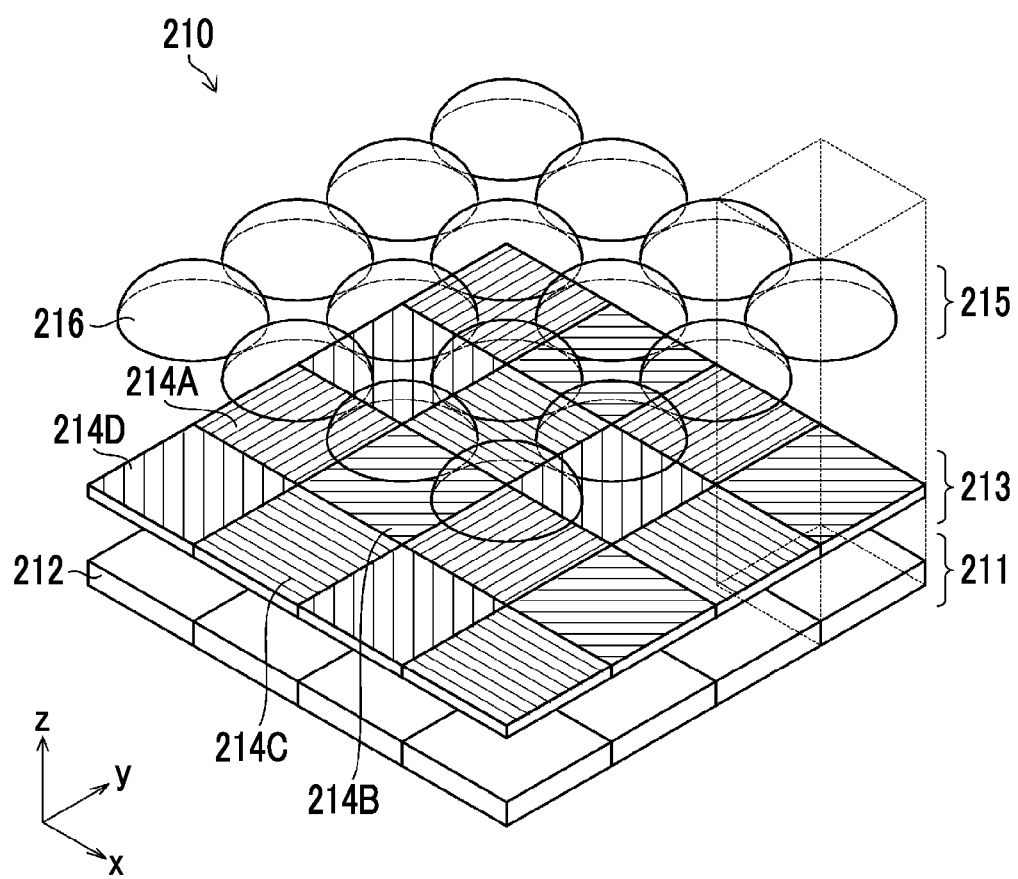
FIG. 2 is a diagram showing the schematic configuration of an imaging element.
Figure 3:
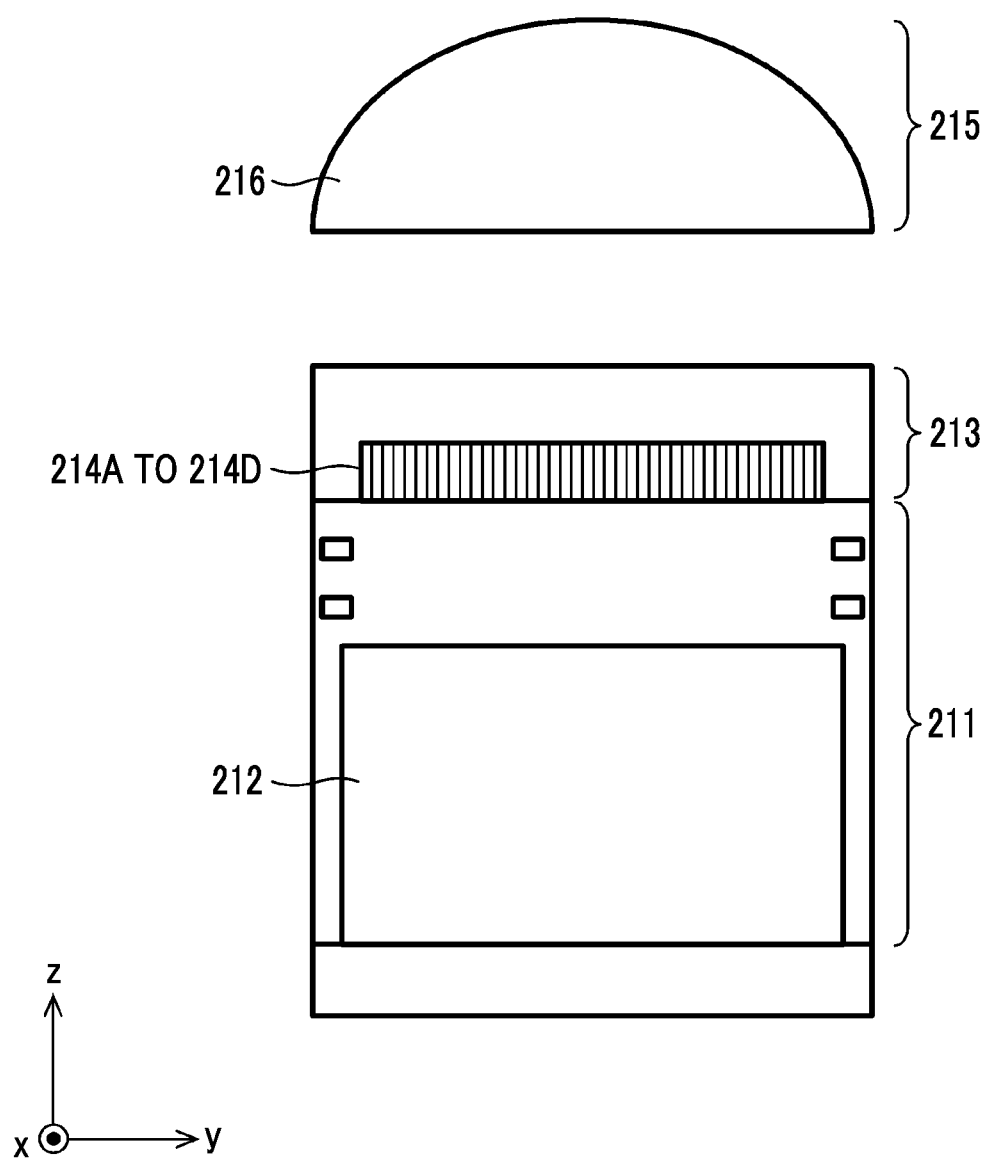
FIG. 3 is a cross-sectional view showing the schematic configuration of one pixel shown in FIG. 2 (a portion shown in FIG. 2 by a broken line).

FIG. 2 is a diagram showing the schematic configuration of the imaging element 210. FIG. 3 is a cross-sectional view showing the schematic configuration of one pixel shown in FIG. 2 (a portion shown in FIG. 2 by a broken line). The imaging element 210 is a complementary metal-oxide semiconductor (CMOS) type imaging element (image sensor), and is a monochrome imaging element that includes a pixel array layer 211, a polarizing filter element-array layer 213, and a microlens array layer 215. The respective layers are arranged in order of the pixel array layer 211, the polarizing filter element-array layer 213 (a plurality of polarizing elements), and the microlens array layer 215 from an image plane side toward an object side (subject side). The imaging element 210 is not limited to a CMOS type imaging element and may be an XY address type imaging element or a charge coupled device (CCD) type image sensor.

The pixel array layer 211 has a configuration in which a lot of photodiodes 212 (a plurality of pixel groups) are two-dimensionally arranged. One photodiode 212 forms one pixel. The respective photodiodes 212 are regularly arranged in a horizontal direction (x direction) and a vertical direction (y direction).

The polarizing filter element-array layer 213 has a configuration in which four types of polarizing filter elements 214A, 214B, 214C, and 214D (a plurality of polarizing elements) having different polarization directions (the polarization directions of light to be transmitted) are two-dimensionally arranged. The polarization directions of the polarizing filter elements 214A, 214B, 214C, and 214D can be set to, for example, 0°, 45°, 90°, and 135°. Further, these polarization directions can be made to correspond to the polarization directions of polarizing filters of an optical member. Due to these polarizing filter elements 214A to 214D, the imaging element 210 includes a plurality of image groups, each of which selectively receives any one of pieces of light transmitted through a plurality of aperture regions. These polarizing filter elements 214A and 214B are arranged at the same intervals as the photodiodes 212, and are provided for pixels, respectively.

The microlens array layer 215 comprises microlenses 216 that are arranged for the respective pixels.

<Configuration of Image Generation Unit>

Figure 4:
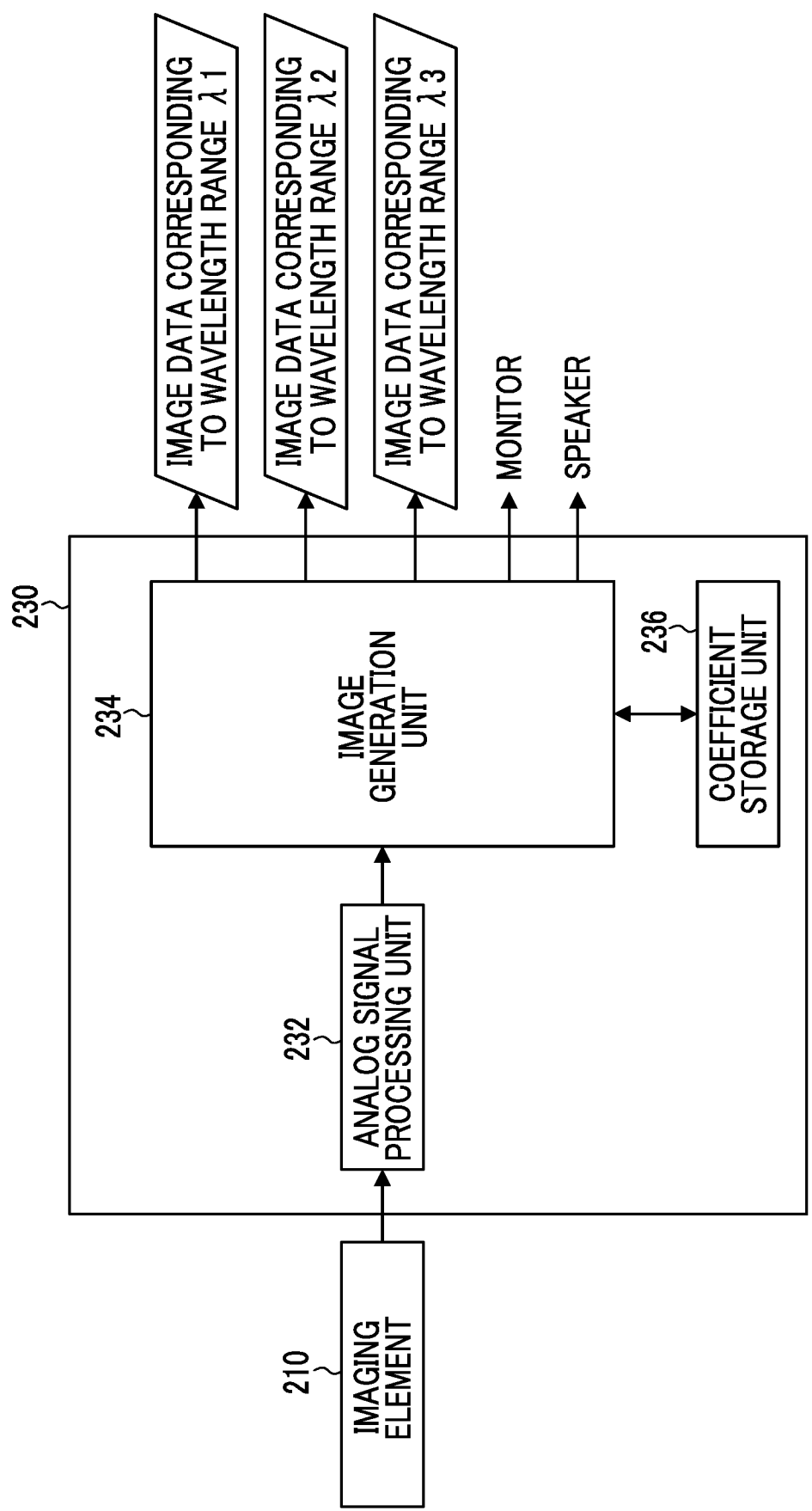
FIG. 4 is a diagram showing the configuration of an image generation unit.

FIG. 4 is a diagram showing the configuration of an image generation unit. The signal processing unit 230 comprises an analog signal processing unit 232 that performs analog signal processing on signals output from the imaging element, an image generation unit 234, and a coefficient storage unit 236.

The analog signal processing unit 232 generates a plurality of images, which correspond to the wavelength ranges of a plurality of optical filters (see FIG. 7 and the like) arranged in the lens device 100, on the basis of a plurality of pixel signals output from the imaging element 210 (image signals corresponding to the different polarization directions). The image generation unit 234 can generate images (three-band multispectral images) having wavelength ranges $\lambda 2$, and $\lambda 3$.

The functions of the above-mentioned image generation unit 234 can be realized using various processors and recording mediums. The various processors also include, for example, a central processing unit (CPU) that is a general-purpose processor realizing various functions by executing software (program), a graphics processing unit (GPU) that is a processor specialized in image processing, and a programmable logic device (PLD) that is a processor of which circuit configuration can be changed after manufacture, such as a field programmable gate array (FPGA). Each function may be realized by one processor or may be realized by a plurality of processors of the same type or different types (for example, a plurality of FPGAs, a combination of a CPU and an FPGA, or a combination of a CPU and a GPU). Further, a plurality of functions may be realized by one processor. The hardware structures of these various processors are more specifically electrical circuitry where circuit elements, such as semiconductor elements, are combined.

In a case where the above-mentioned processors or electrical circuitry executes software (program), codes, which can be read by a computer (for example, various processors or electrical circuitry forming the image generation unit 234, and/or a combination thereof), of the software to be executed are stored in a non-transitory recording medium, such as a read only memory (ROM), and a computer refers to the software.

In a case where the imaging apparatus 10 receives an imaging instruction input from a shutter release switch (not shown) or the like, the imaging apparatus 10 performs the exposure control of the imaging element 210. The optical image of a subject, which is formed on the light-receiving surface of the imaging element 210 by this exposure control, is converted into electrical signals by the imaging element 210. Electric charge corresponding to the amount of light incident on the photodiode 212 is accumulated in each pixel of the imaging element 210, and electrical signals corresponding to the quantity of electric charge accumulated in each pixel are read out as image signals and output from the imaging element 210.

<Configuration of Lens Device>

First Embodiment

Figure 5:
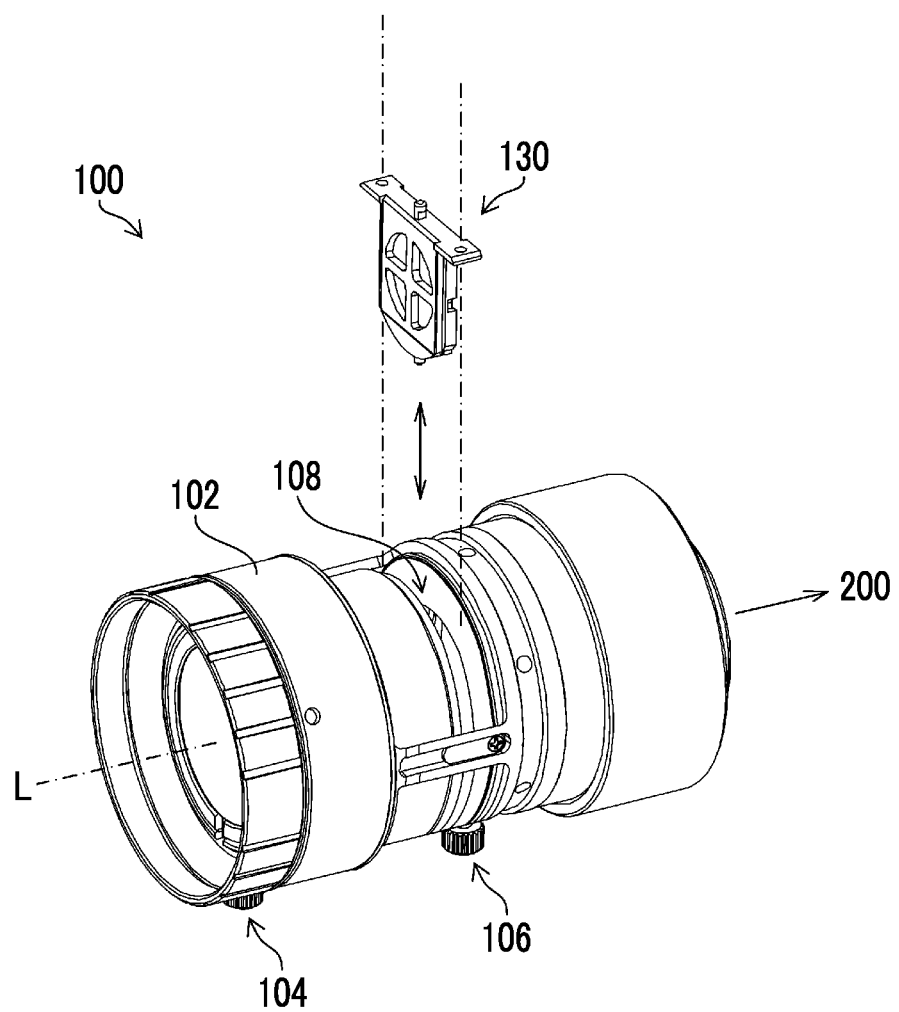
FIG. 5 is a perspective view showing the appearance of a lens device.
Figure 6:
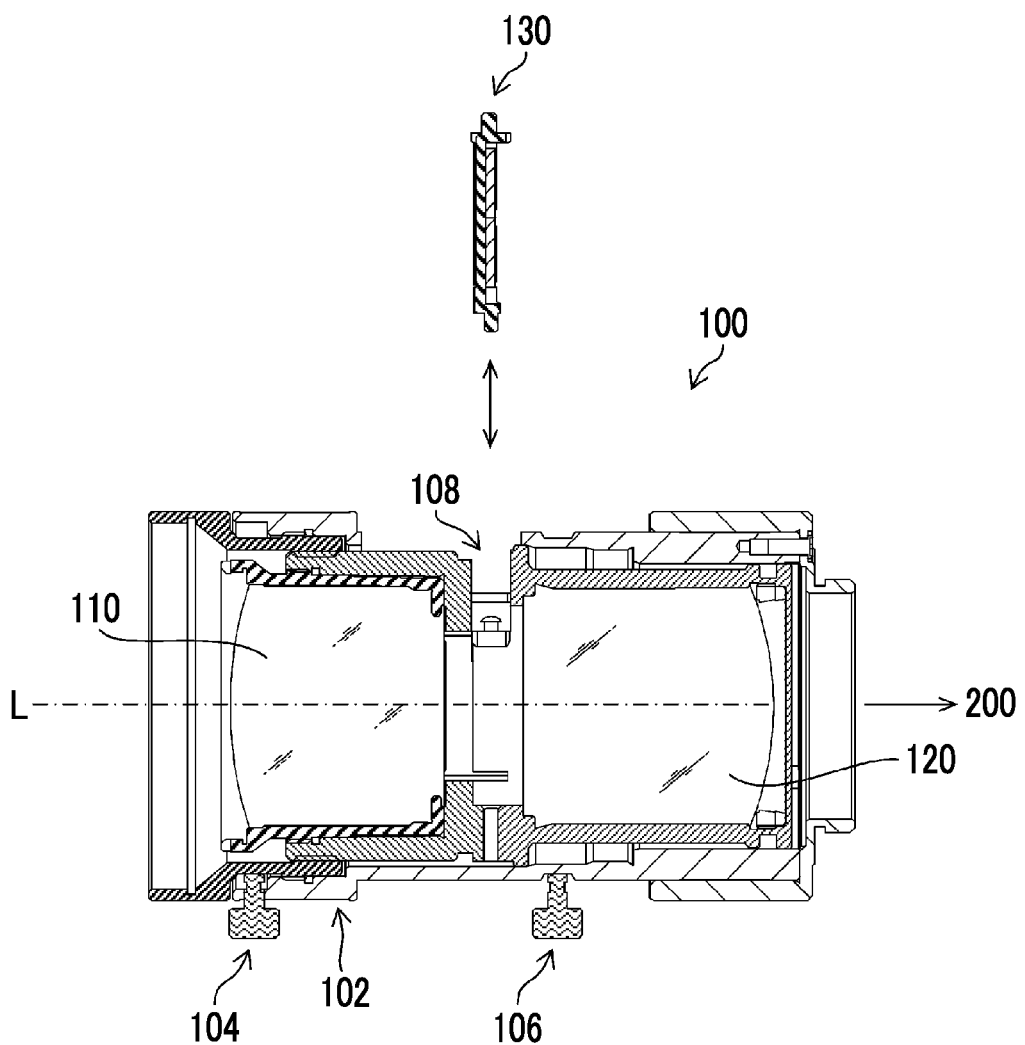
FIG. 6 is a cross-sectional view of the lens device taken in the direction of an optical axis.

FIG. 5 is a perspective view showing the appearance of the lens device 100, and FIG. 6 is a cross-sectional view of the lens device 100 taken in the direction of an optical axis L. As shown in FIGS. 5 and 6, a single imaging optical system (optical system) composed of a first lens 110 and a second lens 120 is disposed in a lens barrel 102 of the lens device 100, and these lens groups are moved forward and backward in the direction of the optical axis L in a case where a first lever 104 and a second lever 106 are moved rotationally, respectively. As a result, a zoom and/or a focus is adjusted. Further, the optical image of a subject is formed on the light-receiving surface of the imaging element by these lenses. Accordingly, the first lens 110 and the second lens 120 form the imaging optical system. Each of the first lens 110 and the second lens 120 may be a lens group composed of a plurality of lenses. Furthermore, a slit 108 is formed in the lens barrel 102 at a pupil position (near the pupil) of the lens device 100, and a first optical member 130 is inserted into the slit 108 and is disposed in a state where the optical axis of the first optical member 130 coincides with the optical axis L of the imaging optical system. Further, a second optical member 150, which emits illumination light incident from the outside of the imaging optical system to the subject side via the imaging optical system, is disposed outside the imaging optical system (see FIGS. 1 and 9).

<Configuration of First Optical Member>

The first optical member 130 can be inserted into and removed from the lens barrel 102 as shown in FIGS. 5 and 6, and optical members having different characteristics can be used according to the characteristics of a light source (subject). As a result, the amount of light emitted from the imaging optical system is adjusted and/or can be adjusted for each of a plurality of aperture regions. Keeping the output (sensitivity) from the imaging element 210 constant or in a specified range over a plurality of wavelength ranges so as to correspond to the aperture regions 132A to 132D, in a case where the lens device 100 is mounted on the imaging apparatus body 200, can be called "adjustment".

Figure 7:
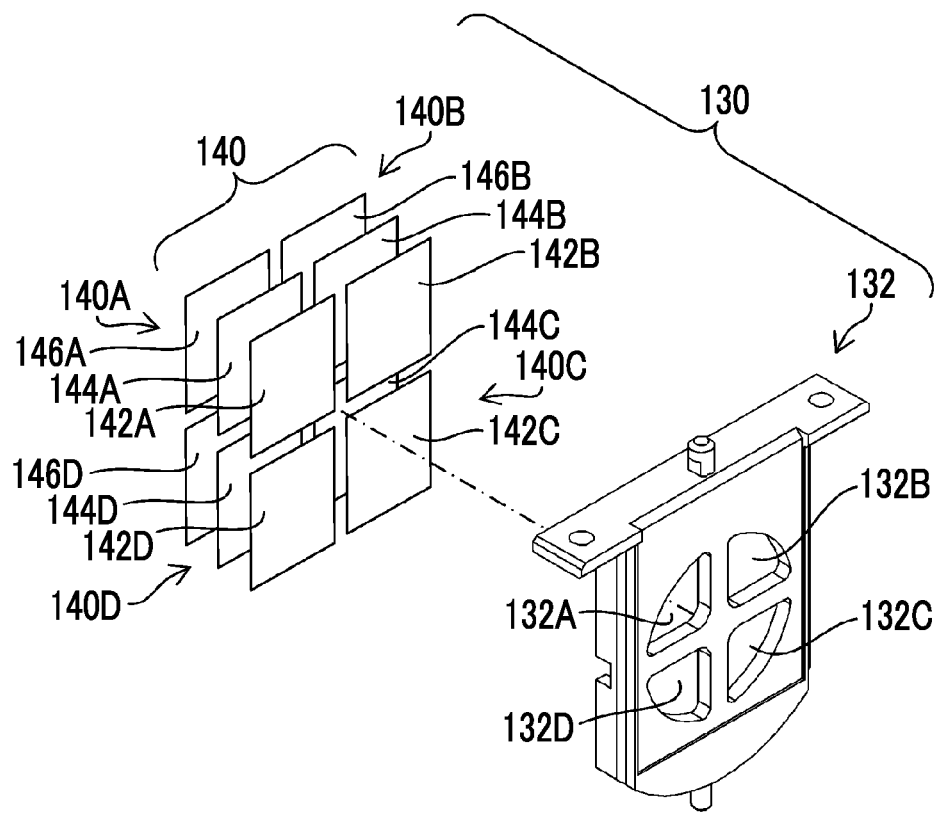
FIG. 7 is a diagram showing a configuration example of a first optical member.

FIG. 7 is a diagram showing a configuration example of the first optical member. The first optical member 130 comprises a frame 132 and filter sets 140. The frame 132 comprises four aperture regions 132A to 132D (a plurality of aperture regions). The shape of each of the aperture regions 132A to 132D is not limited to a fan shape, and may be other shapes, such as a circular shape, a rectangular shape, and a polygonal shape. As shown in FIG. 7, filter sets 140A to 140D (optical filters (color filters), polarizing filters, and dark filters) are disposed in these aperture regions (on the back side of the frame 132), respectively. The filter sets 140A to 140D may be fixed using an adhesive.

The filter set 140A has a configuration in which an optical filter 142A, a polarizing filter 144A, and a dark filter 146A are overlaid. Likewise, the filter set 140B has a configuration in which an optical filter 142B, a polarizing filter 144B, and a dark filter 146B are overlaid. The filter set 140C has a configuration in which an optical filter 142C, a polarizing filter 144C, and a dark filter (not shown) are overlaid. The filter set 140D comprises an optical filter 142D, a polarizing filter 144D, and a dark filter 146D.

The optical filters 142A to 142D are a plurality of optical filters (band-pass filters) that transmit lights having at least some wavelength ranges different from each other, the polarizing filters 144A to 144C are a plurality of polarizing filters having different polarization directions, and the dark filters 146A to 146D are dark filters that dim light passing through the aperture regions 132A to 132D. The polarization directions of the polarizing filters 144A to 144D can be set to four directions (of which the number is equal to the number of the aperture regions; for example, 0°, 45°, 90°, and 135°) at most. Each of the polarizing filters 144A to 144D may be a filter that polarizes light using a polarizing film or may be a filter that polarizes light using wire grids or a plurality of slits.

The dark filters 146A to 146D are filters that dim light transmitted through the aperture regions 132A to 132D. For example, a neutral density (ND) filter can be used as the dark filter. The degrees of dimming of the dark filters 146A to 146D may be different for some or all filters, and a user can use a dark filter having a selected degree of dimming to adjust a light amount ratio between the aperture regions 132A to 132D.

Since the light amount ratio of the first optical member 130 can be adjusted in a manufacturing step, the first optical member 130 is effective in acquiring a multispectral image having a good image quality. Further, the stiffness of the optical member can be increased. Furthermore, since the aperture areas of the aperture regions 132A to 132D are not adjusted in the first optical member 130, the brightness of an image to be generated can be ensured and the first optical member 130 is effective in a case where a user wants to reduce the depth of field or a case where a user wants to prevent an image blur caused by a small stop.

Another Embodiment of First Optical Member

Figure 8:
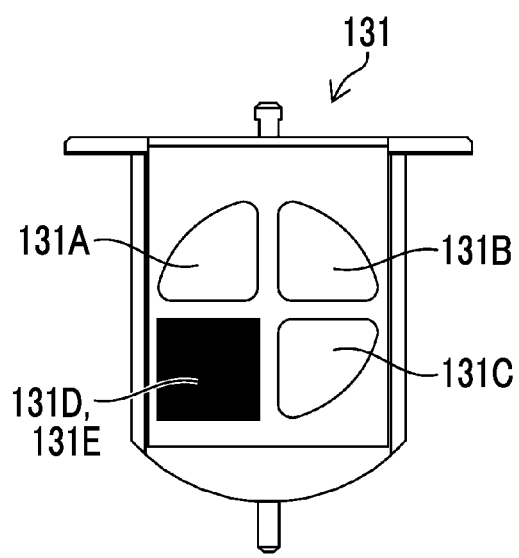
FIG. 8 is a diagram showing an example of the arrangement of aperture regions in the case of three wavelengths.

FIG. 8 is a diagram showing an example of the arrangement of aperture regions in the case of three wavelengths. A case where the aperture regions (wavelength ranges) and the polarization directions are four types has been described in the first optical member 130 shown in FIG. 7, but the aperture regions and the polarization directions may be three or less types. The reason for this is that only images in three wavelength ranges corresponding to three polarization directions even at most can be separated in a case where an imaging element of which the polarization directions of polarizing filter elements are four types is used as a monochrome imaging element (without color filters), such as the imaging element 210. In a case where the number of aperture regions is three, one aperture can be shielded by a shielding member. FIG. 8 shows a frame 131 in a state where one (aperture region 131D) of four aperture regions 131A to 131D is shielded by a shielding member 131E. Further, optical filters having the same wavelength range and polarizing filters having the same polarization direction can also be disposed in two aperture regions of the four aperture regions.

<Configuration of Second Optical Member>

FIG. 9 is a diagram showing the schematic configuration of the lens device according to the first embodiment. In FIG.

9, each of the first lens 110 and the second lens 120 is shown as a lens group composed of a plurality of lenses (the same applies to embodiments to be described below). The second optical member 150 is provided in the lens barrel 102 and is provided closer to the subject side than the first optical member 130. The second optical member 150 emits illumination light, which is incident from the outside of the imaging optical system, to the subject side via the imaging optical system.

In the lens device 100 according to the first embodiment, the second optical member 150 is provided on the frame 132 of the first optical member 130 as shown in FIG. 9. As described above, the first optical member 130 is attachably and detachably disposed in the slit 108 of the lens barrel 102. Further, since the pupil position (near the pupil) at which the slit 108 is provided is provided between the first lens 110 and the second lens 120, a space in which the second optical member 150 is to be installed can be ensured.

As long as the second optical member 150 can emit light, which is incident from the outside of the imaging optical system, to the subject side in a direction coaxial with the optical axis of the imaging optical system, the second optical member 150 is not particularly limited. For example, a diffusion plate, a mirror, and the like can be used as the second optical member 150.

An illumination device 160, which emits illumination light, is provided outside the lens barrel 102. A publicly known illumination device can be used as the illumination device 160 and, for example, a halogen lamp, an LED light, and the like can be used.

Figure 10A:
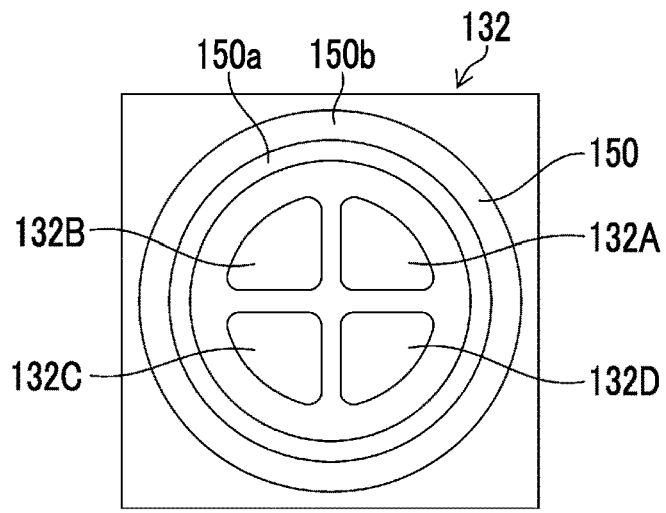
FIGS. 10A, 10B, and 10C are diagrams showing the shapes of second optical members.
Figure 10B:
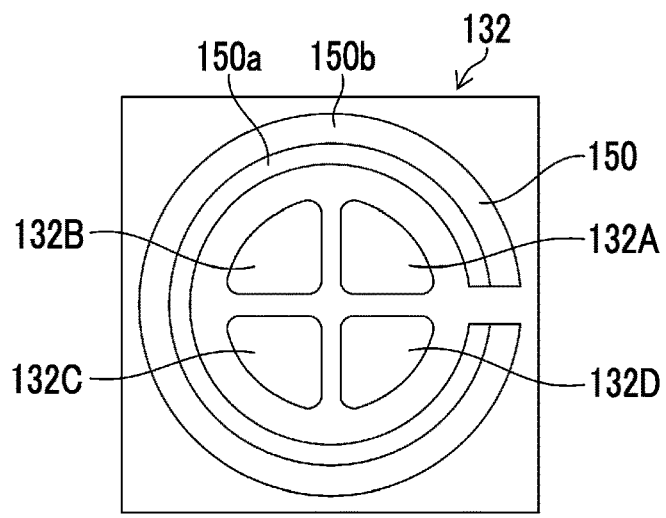
Figure 10C:
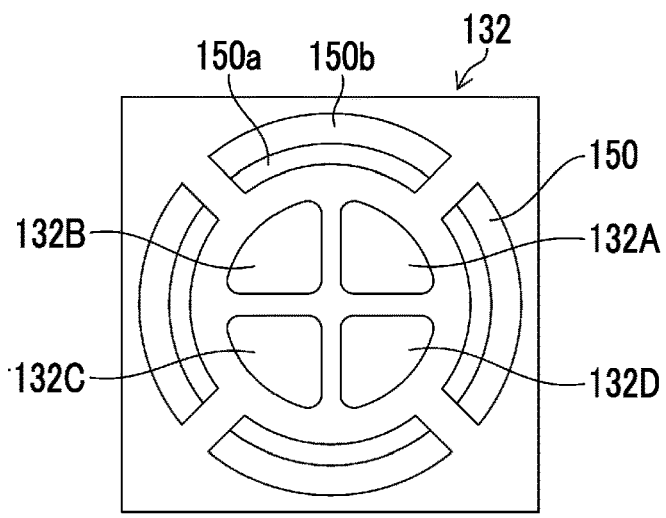

FIGS. 10A, 10B, and 10C are diagrams showing the shapes of second optical members. As shown in FIG. 10A, the second optical member 150 is disposed coaxially with the outer periphery of the imaging optical system in the shape of a ring surrounding the aperture regions 132A to 132D of the first optical member 130. Since the second optical member 150 is disposed in the shape of a ring, light can be incident in all directions from the outside of the imaging optical system. As a result, a subject can be irradiated with uniform light.

FIGS. 10B and 10C are diagrams showing other shapes of other second optical members. As shown in FIG. 10B, the second optical member 150 may be provided coaxially with the optical axis of the imaging optical system such that at least a part of the second optical member 150 surrounds the outer periphery of the first optical member 130. Alternatively, a plurality of second optical members 150 may be provided on the circumference of the first optical member 130 about the optical axis of the imaging optical system. As long as the second optical member 150 is provided around the first optical member 130 even though the second optical member 150 is not provided over the entire circumference of the first optical member 130, illumination light can be incident from the outside of the imaging optical system.

In a case where a diffusion plate is used as the second optical member 150, a publicly known diffusion plate can be used as the diffusion plate. For example, an end surface 150a of the diffusion plate, which faces the optical axis of the imaging optical system in a case where the diffusion plate is disposed in the lens device 100, is formed of a fine convex structure or a fine concave structure, and illumination light can be diffused and emitted in the optical system in a case where light is emitted from the end surface 150a. In a case where a reflective film is provided on a side surface 150b of the diffusion plate, light incident from the outside of the diffusion plate can be emitted from the end surface 150a facing the optical axis. Further, the end surface 150a of the second optical member 150 facing the optical axis is provided to be inclined in a direction widening outward from the first optical member 130 toward the subject side. Since the end surface 150a is provided to be inclined in a direction widening toward the subject side, illumination light incident on the diffusion plate can be emitted toward the subject side.

Since illumination light incident from the outside of the imaging optical system is emitted to the subject side via the optical system provided in the lens barrel 102, illumination coaxial with the imaging optical system can be provided. Since illumination coaxial with the imaging optical system can be provided, light reflected from the subject can be efficiently taken in by the first optical member 130 and an image having a good image quality can be acquired. Further, in a case where coaxial illumination via the imaging optical system is used to irradiate a minute subject or the like for macro imaging, illumination light can be effectively applied to the subject. Furthermore, since the position of the second optical member 150 is set to be closer to the subject side than the first optical member 130, illumination light does not pass through the first optical member 130 in a case where a subject is irradiated with illumination light. Accordingly, it is possible to prevent total reflection in the first optical member 130, and to prevent interference removal from not being performed correctly due to overexposure.

<Image Generation Processing>

Next, image generation processing using the lens device 100 and the imaging apparatus body 200 having the above-mentioned configuration will be described. Here, in the optical member, the wavelength ranges of the optical filters are three types ($\lambda 1$ to $\lambda 3$), the polarization directions are also three types (for example, 0°, 45°, and 90°), and the polarization directions of the imaging element 210 are four types (0°, 45°, 90°, and 135°). For example, the frame 131 (the aperture region 131D is shielded) shown in FIG. 8 is used in this case.

<Coefficient Group for Interference Removal>

In order to obtain images corresponding to the wavelength ranges ($\lambda 1$ to $\lambda 3$), it is necessary to separate and extract pixel signals, which correspond to the respective wavelength ranges, from the respective pixels of the imaging element 210. However, interference (cross talk) occurs in these image data. That is, since lights having the respective wavelength ranges are incident on the respective pixels, an image to be generated is an image in which images corresponding to the wavelength ranges $\lambda 1$ to $\lambda 3$ are mixed. For this reason, the image generation unit 234 performs interference removal processing to generate image data corresponding to the respective wavelength ranges ($\lambda 1$ to $\lambda 3$).

Ratios (interference ratios) at which lights having the respective wavelength ranges $\lambda 1$ to $\lambda 3$ and emitted from the lens device 100 are received by the respective pixels can be uniquely determined from the setting of the wavelength ranges $\lambda 1$ to $\lambda 3$ of lights transmitted by the optical filters 142A to 142C, the setting of the polarization directions of lights transmitted by the polarizing filters 144A to 144C, and the setting of the polarization directions (four directions) of lights received by the respective pixels of the imaging element 210; and can be obtained in advance. The image generation unit 234 can calculate the interference ratios from a plurality of images, which are acquired in a state where any one of a plurality of shielding members is mounted on the lens device, using the plurality of shielding members that shield aperture regions other than a specific aperture region among a plurality of aperture regions.

Figure 11A:
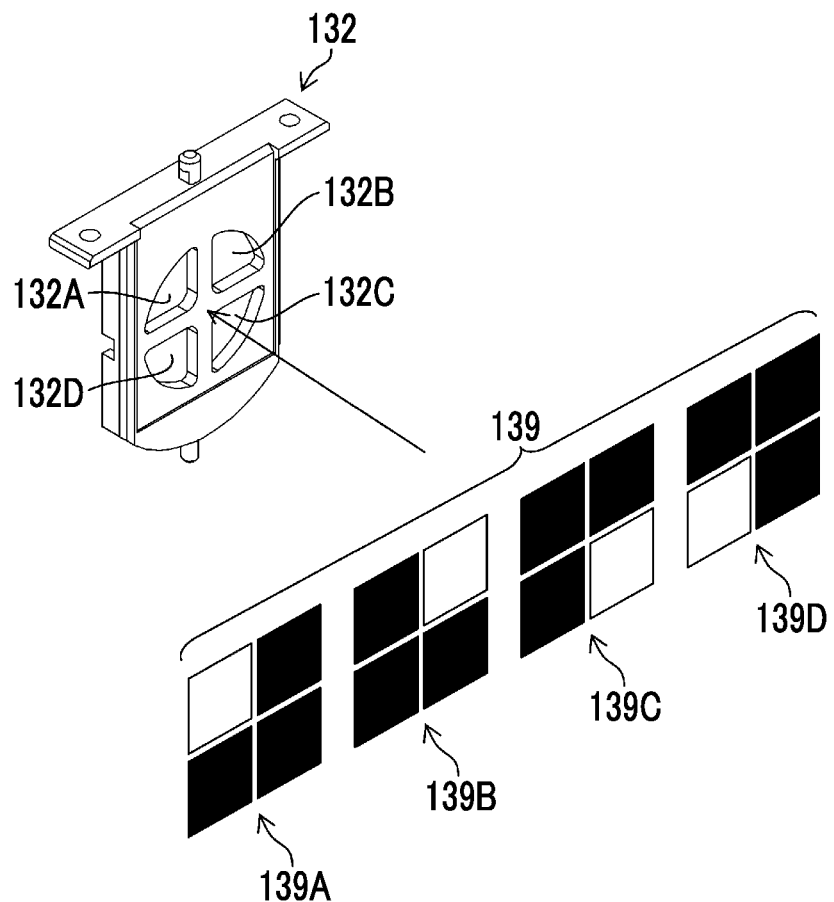
FIGS. 11A and 11B are diagrams showing aspects in which a shielding member is mounted on the frame.
Figure 11B:
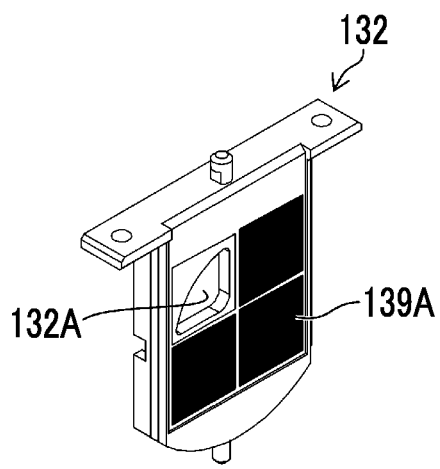

FIGS. 11A and 11B are diagrams showing aspects in which a shielding member is mounted on the frame 132. As shown in FIG. 11A, a shielding member 139 comprises a plurality of shielding members each of which opens any one of the aperture regions 132A to 132D of the frame 132 and shields the other aperture regions. Specifically, each of the shielding members 139A to 139D shields aperture regions other than each of the aperture regions 132A, 132B, 132C, and 132D (a specific aperture region). FIG. 11B shows the frame 132 on which the shielding member 139A is mounted. In a case where the aperture regions and the polarization directions are three or less types as described above (for example, a case where one or more aperture regions are shielded among four apertures or a case where an optical member including three or less aperture regions is used), the shielding members may also be three or less types. A case where the aperture regions and the polarization directions are three or less types will be described.

In this case, imaging is performed using the shielding members 139A to 139C one by one, so that three images corresponding to three wavelength ranges are obtained. The image generation unit 234 calculates coefficient groups (the respective elements of an interference removal matrix) for interference removal processing from these images, and the coefficient storage unit 236 stores these coefficient groups.

The image generation unit 234 acquires coefficient groups from the coefficient storage unit 236, calculates pixel signals corresponding to the respective wavelength ranges λ1 to λ3 from pixel signals obtained from the respective pixels by the following equation 1, and generates image data corresponding to the respective wavelength ranges λ1 to λ3. In Equation 1, for example, a pixel signal corresponding to the wavelength range λ1 (the polarizing filter element 214A having a polarization direction of 0°) is denoted by λ1, a pixel signal corresponding to the wavelength range λ2 (the polarizing filter element 214B having a polarization direction of 45°) is denoted by x2, and a pixel signal corresponding to the wavelength range λ3 (the polarizing filter element 214C having a polarization direction of 90°) is denoted by x3. Further, a matrix A is acquired from the coefficient storage unit 236. The image generation unit 234 acquires pixel signals X1, X2, and X3 (image data) corresponding to spectral images, which are subjected to interference removal and correspond to the wavelength ranges λ1 to λ3, from three pixel signals x1, x2, and x3 by the following equation 1 that uses the matrix A. The image data, which correspond to the respective wavelength ranges λ1 to λ3 and are generated by the image generation unit 234, are output to the outside and are stored in a storage device (not shown) as necessary. Further, the image data are displayed on a display (not shown) as necessary.

$$A = \begin{bmatrix} a11 & a12 & a13 \\ a21 & a22 & a23 \\ a31 & a32 & a33 \end{bmatrix} \quad (1)$$

$$\begin{bmatrix} X1 \\ X2 \\ X3 \end{bmatrix} = \begin{bmatrix} a11 & a12 & a13 \\ a21 & a22 & a23 \\ a31 & a32 & a33 \end{bmatrix} * \begin{bmatrix} x1 \\ x2 \\ x3 \end{bmatrix}$$

According to this embodiment, since the second optical member 150, on which illumination light is incident from the outside of the imaging optical system and which emits the illumination light to the subject side via the imaging optical system, is provided closer to the subject side than the first optical member 130, the illumination light does not pass through the first optical member 130 and the subject can be illuminated with the illumination light coaxial with the optical axis of the imaging optical system. Accordingly, light reflected from the subject can be efficiently taken in by the first optical member 130 and an image having a good image quality can be acquired. Further, it is possible to prevent the total reflection of illumination light in the first optical member 130, and to correctly perform interference removal.

Modification Example 1

Figure 12:
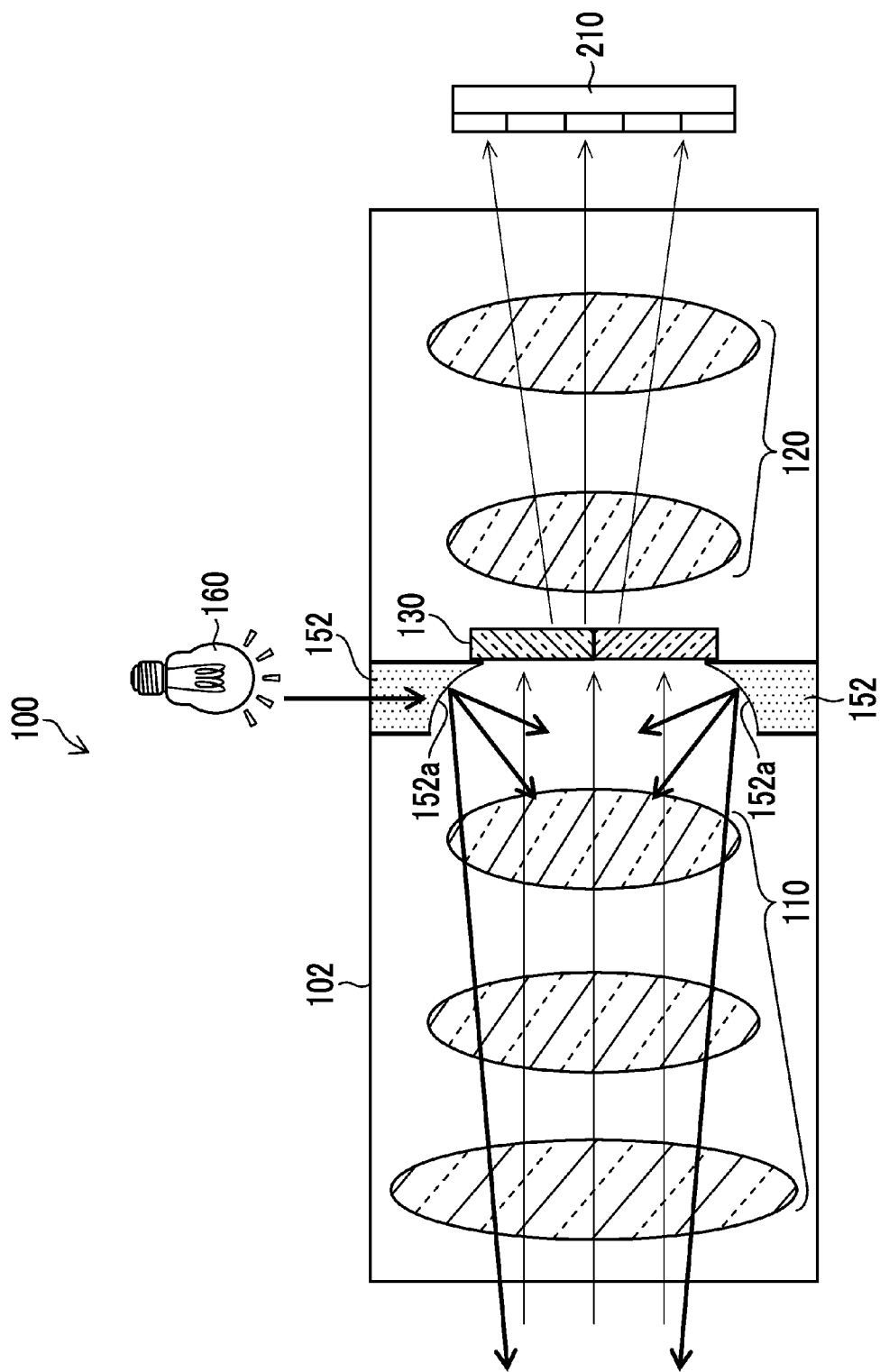
FIG. 12 is a diagram showing the schematic configuration of a lens device according to a modification example of the first embodiment.

FIG. 12 is a diagram showing the schematic configuration of a lens device according to a modification example. A second optical member 152 shown in FIG. 12 is provided such that an end surface 152a facing an optical axis widens toward the subject side. Even though the end surface 152a facing the optical axis has a curvature and is disposed to widen, illumination light can be emitted to the subject side and illumination coaxial with the optical axis of the imaging optical system can be provided.

Modification Example 2

Figure 13:
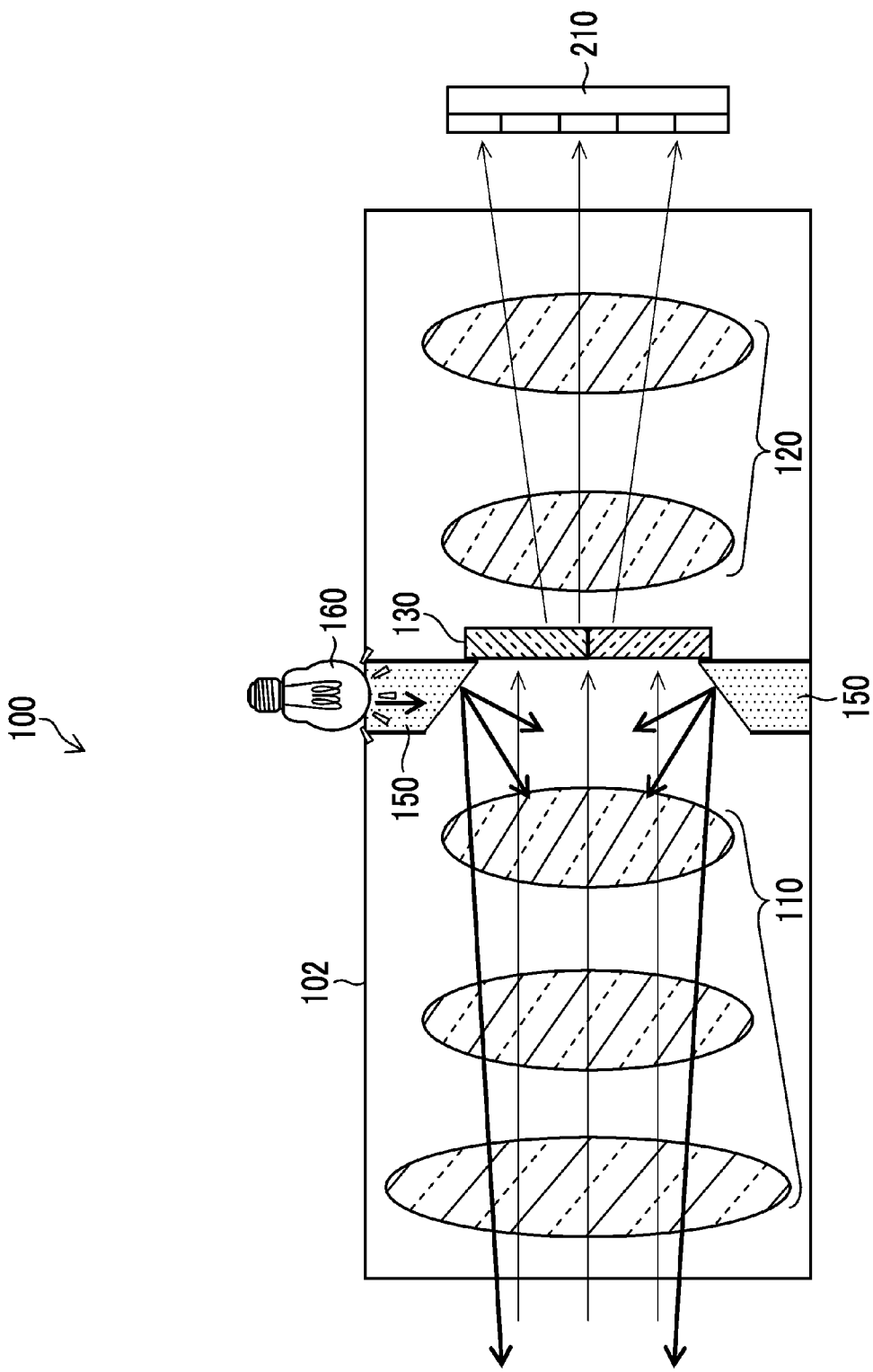
FIG. 13 is a diagram showing the schematic configuration of a lens device according to another modification example of the first embodiment.

FIG. 13 is a diagram showing the schematic configuration of a lens device according to another modification example. A lens device 100 shown in FIG. 13 is different from the lens device shown in FIG. 9 in that an illumination device 160 is close to a second optical member 150. Since the illumination device 160 is close to the second optical member 150, light emitted from the second optical member 150 has directivity. As a result, stronger illumination light can be emitted to the subject side.

Modification Example 3

Figure 14:
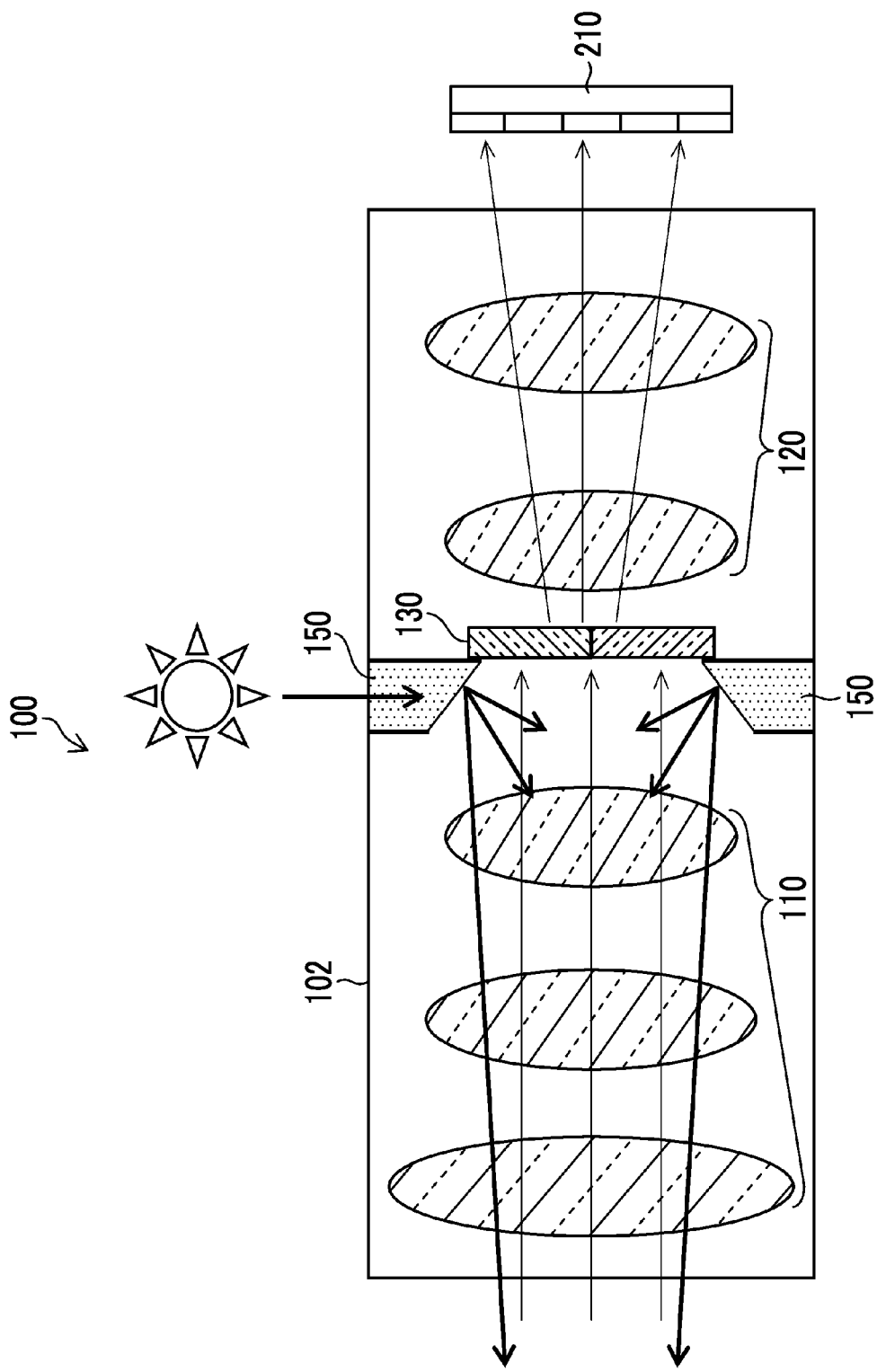
FIG. 14 is a diagram showing the schematic configuration of a lens device according to still another modification example of the first embodiment.

FIG. 14 is a diagram showing the schematic configuration of a lens device according to still another modification example. The lens device shown in FIG. 14 is different from the lens device shown in FIG. 9 in that an illumination device is not provided. The lens device shown in FIG. 14 is an aspect in which natural light is used as illumination light.

Even in a use in which a user wants to perform spectral observation with the spectrum of natural light, for example, sunlight without using an illumination device, natural light is incident from the second optical member 150 and coaxial illumination can be provided to the subject side.

Second Embodiment

Figure 15:
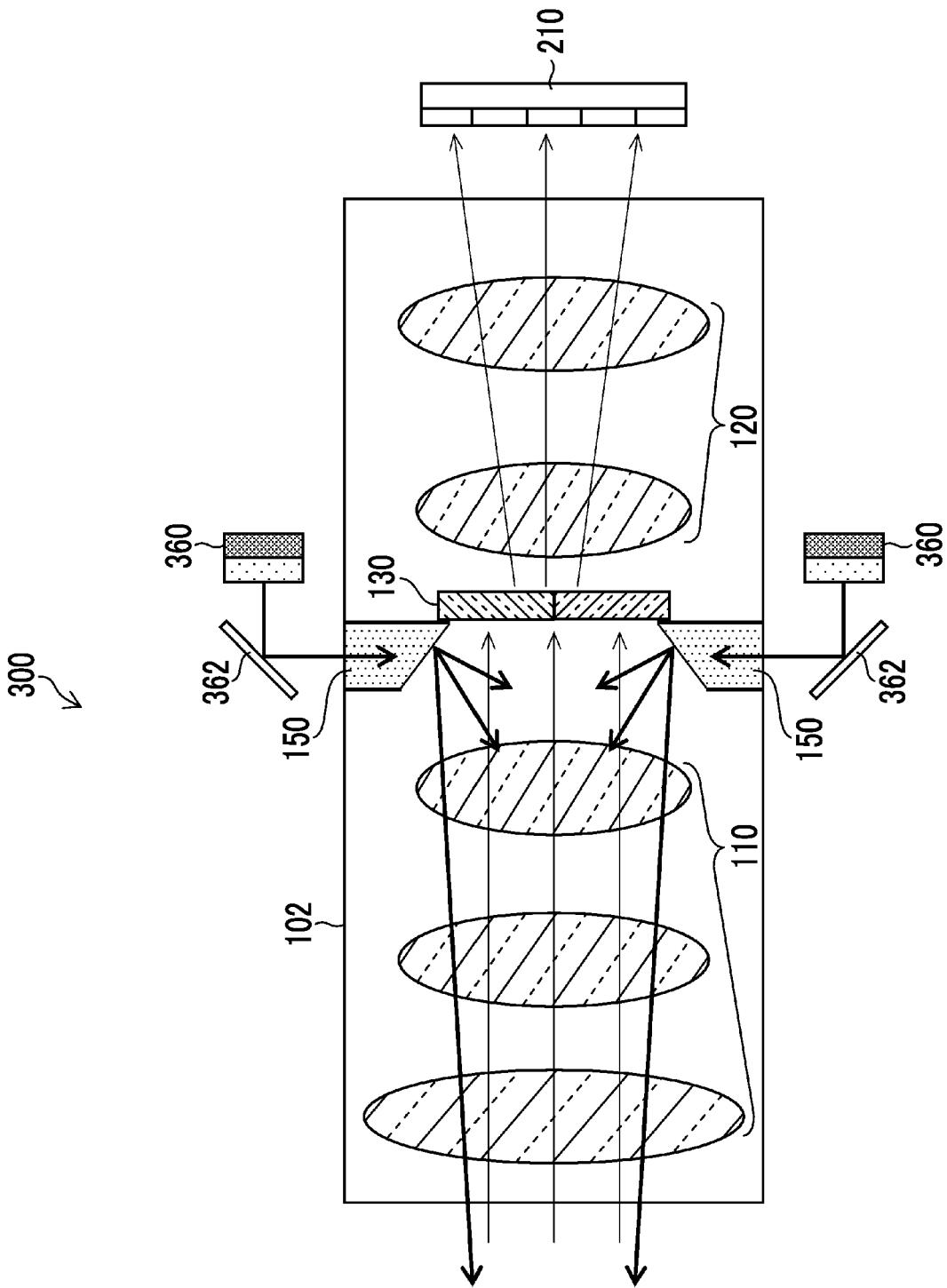
FIG. 15 is a diagram showing the schematic configuration of a lens device according to a second embodiment.

FIG. 15 is a diagram showing the schematic configuration of a lens device according to a second embodiment. The lens device 300 according to the second embodiment is different from the lens device 100 according to the first embodiment in that a ring illumination 360 is used as an illumination device. Illumination light emitted from the ring illumination 360 is incident on a second optical member 150 through a mirror 362. Since the ring illumination 360 is used to cause illumination light to be incident, a subject can be irradiated with illumination light which is emitted from the outer periphery of the imaging optical system and of which the amount is uniform.

Third Embodiment

Figure 16:
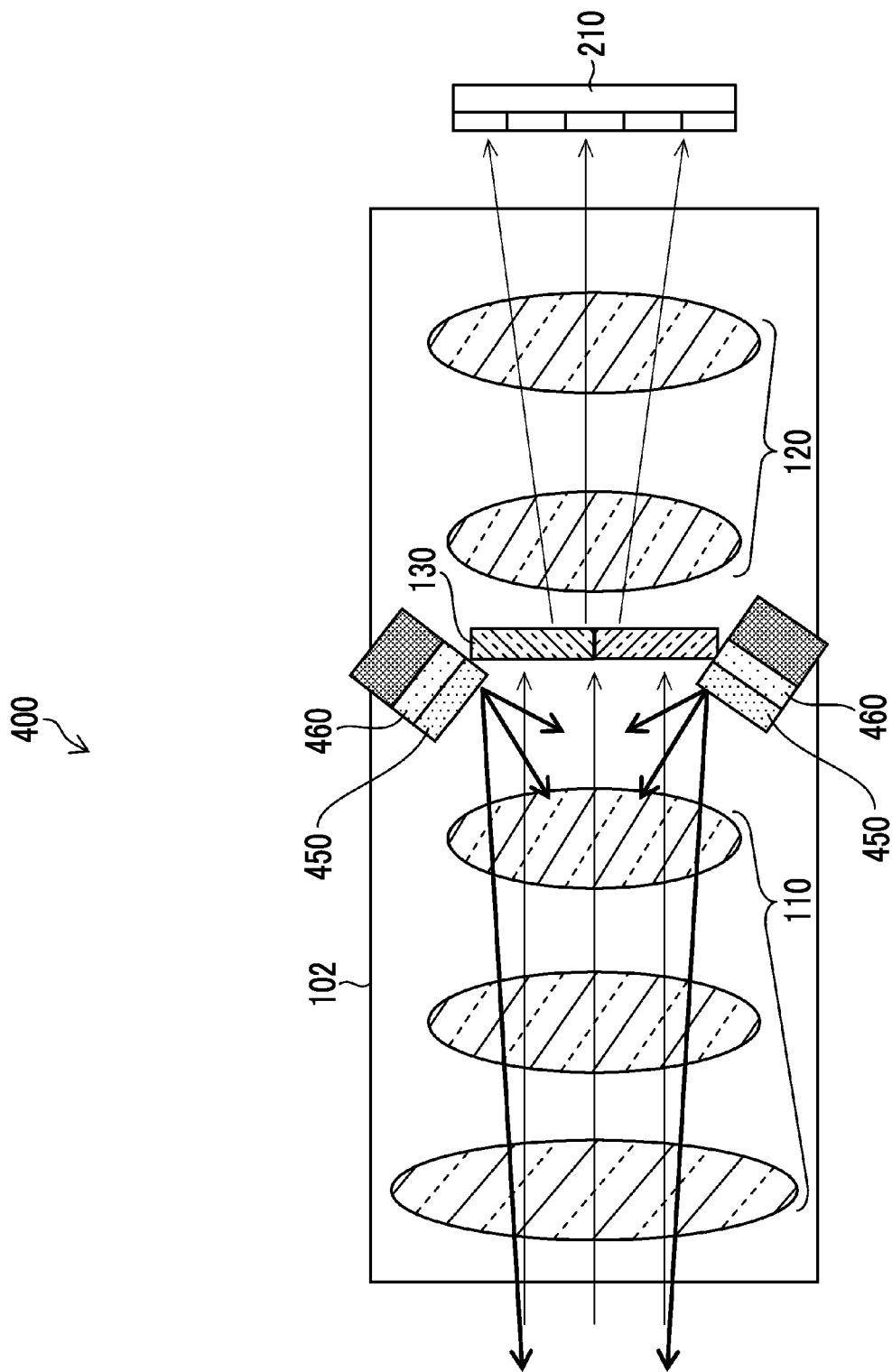
FIG. 16 is a diagram showing the schematic configuration of a lens device according to a third embodiment.

FIG. 16 is a diagram showing the schematic configuration of a lens device according to a third embodiment. The lens device 400 according to the third embodiment is different from the lens devices according to the embodiments in that an illumination device (light source) 460 is disposed in a lens barrel 102. Since the illumination device 460 is disposed in the lens barrel 102 to emit illumination light to the subject side via the imaging optical system, the illumination light can be emitted only near a subject. For example, the lens device 400 is suitably used in a situation where it is preferable that imaging environment is a darkroom.

A second optical member 450 may be provided on the frame 132 of a first optical member 130 as in the first embodiment and the second embodiment and the illumination device 460 may be provided outside the second optical member 450 to cause illumination light to be incident on the second optical member 450. Further, the second optical member 450 may be provided on a light emitting surface of the illumination device 460.

Modification Example 1

Figure 17:
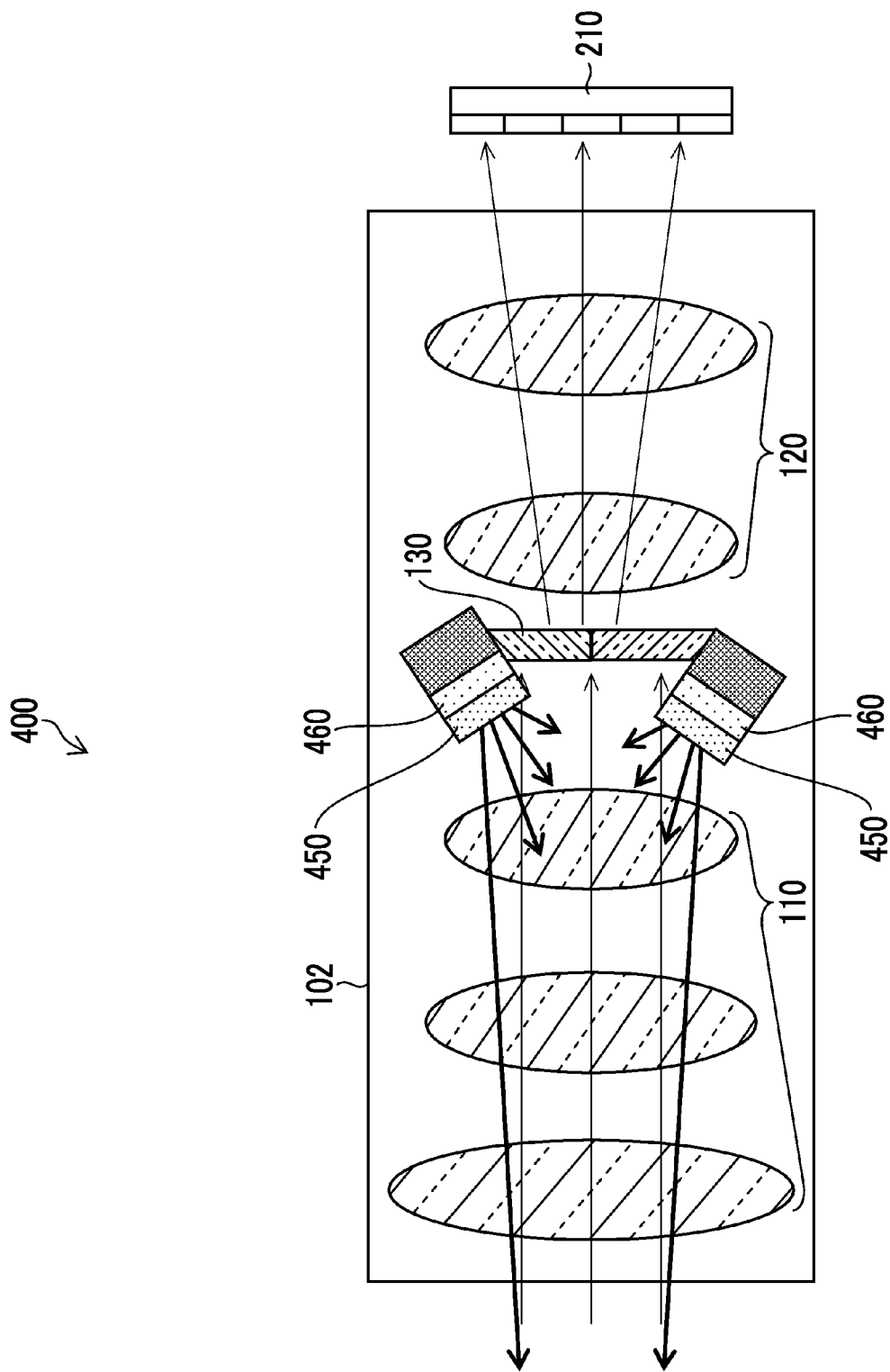
FIG. 17 is a diagram showing the schematic configuration of a lens device according to a modification example of the third embodiment.

FIG. 17 is a diagram showing the schematic configuration of a lens device according to a modification example of the third embodiment. A lens device 400 shown in FIG. 17 is different from the lens device shown in FIG. 16 in that a second optical member 450 and an illumination device 460 are provided on an optical path of a first lens 110 of an imaging optical system.

Since the second optical member 450 and the illumination device 460 are provided on the optical path of the first lens 110, luminous flux at a peripheral portion of a generated image is reduced due to vignetting. However, since illumination light can be further incident in the direction of an optical axis of the imaging optical system, the amount of light that can be applied to a subject can be increased. Accordingly, light reflected from the subject can be efficiently taken in by the first optical member 130.

Modification Example 2

Figure 18:
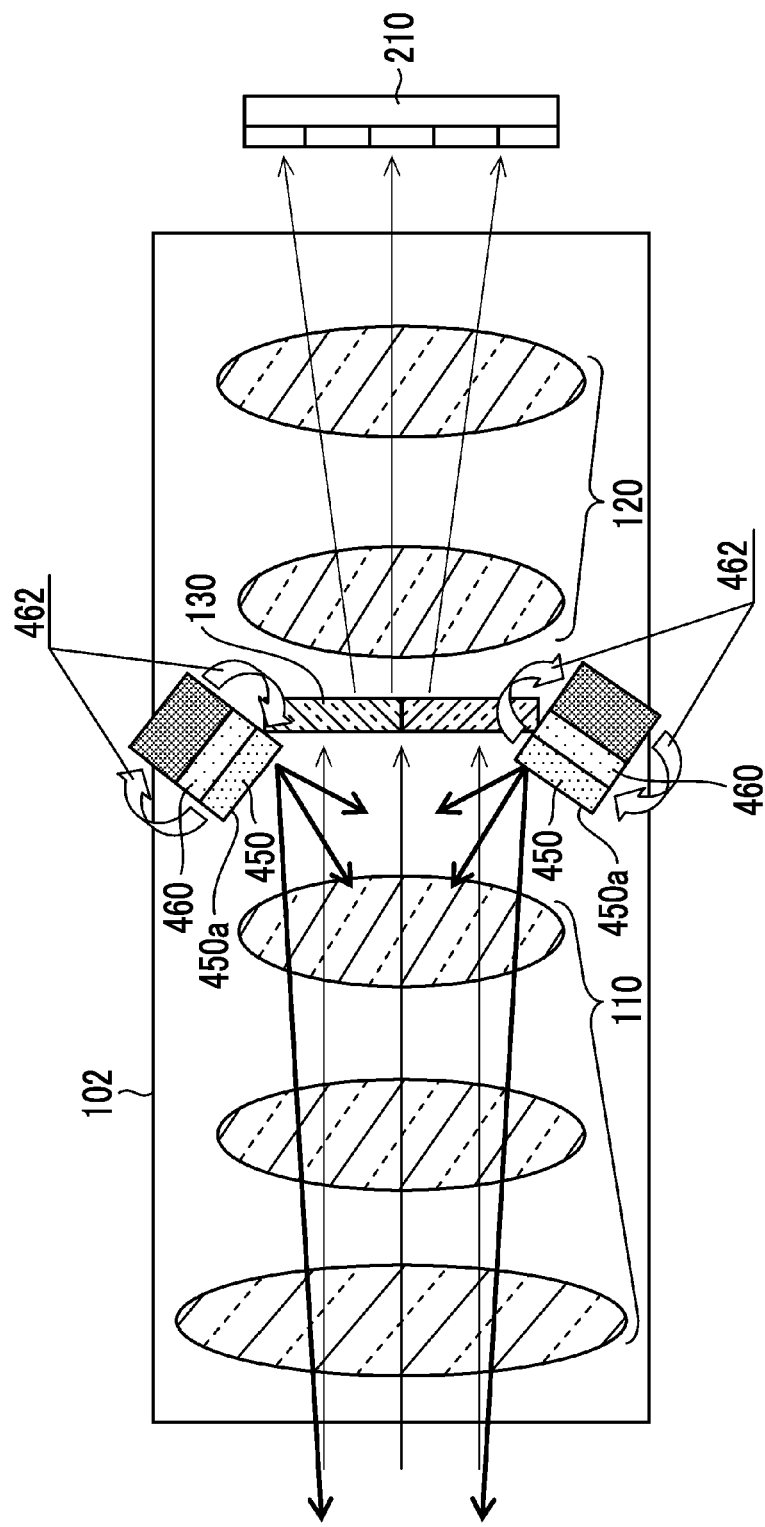
FIG. 18 is a diagram showing the schematic configuration of a lens device according to another modification example of the third embodiment.

FIG. 18 is a diagram showing the schematic configuration of a lens device according to another modification example of the third embodiment. A lens device 400 shown in FIG. 18 is different from the embodiments in that an inclination angle of an end surface 450a of a second optical member 450 facing an optical axis of an imaging optical system can be changed in a vertical direction and a lateral direction.

Since the inclination angle of the end surface 450a of the second optical member 450 is adapted to be changeable (tilt-adjustable) in the vertical direction and the lateral direction as shown by arrows 462 of FIG. 18, a region to be irradiated with illumination light can be adjusted. Since the inclination angle of the end surface 450a is adapted to be changeable, a region to be irradiated with illumination light can be adjusted by a change in the inclination angle of the end surface 450a of the second optical member 450 even in a case where the position of a lens is changed by the adjustment of a focus. Accordingly, the amount of illumination light to be applied to a subject can be maintained.

In a case where the inclination angle of the end surface 450a of the second optical member 450 is to be changed, the entire second optical member 450 may be rotated in the vertical direction and the lateral direction to perform polarization. Alternatively, in a case where the second optical member 450 is formed of a plurality of second optical members 450 as shown in FIG. 10C or in a case where the second optical member 450 is divided, the inclination angle of the end surface of each second optical member may be adapted to be changeable.

Fourth Embodiment

Figure 19:
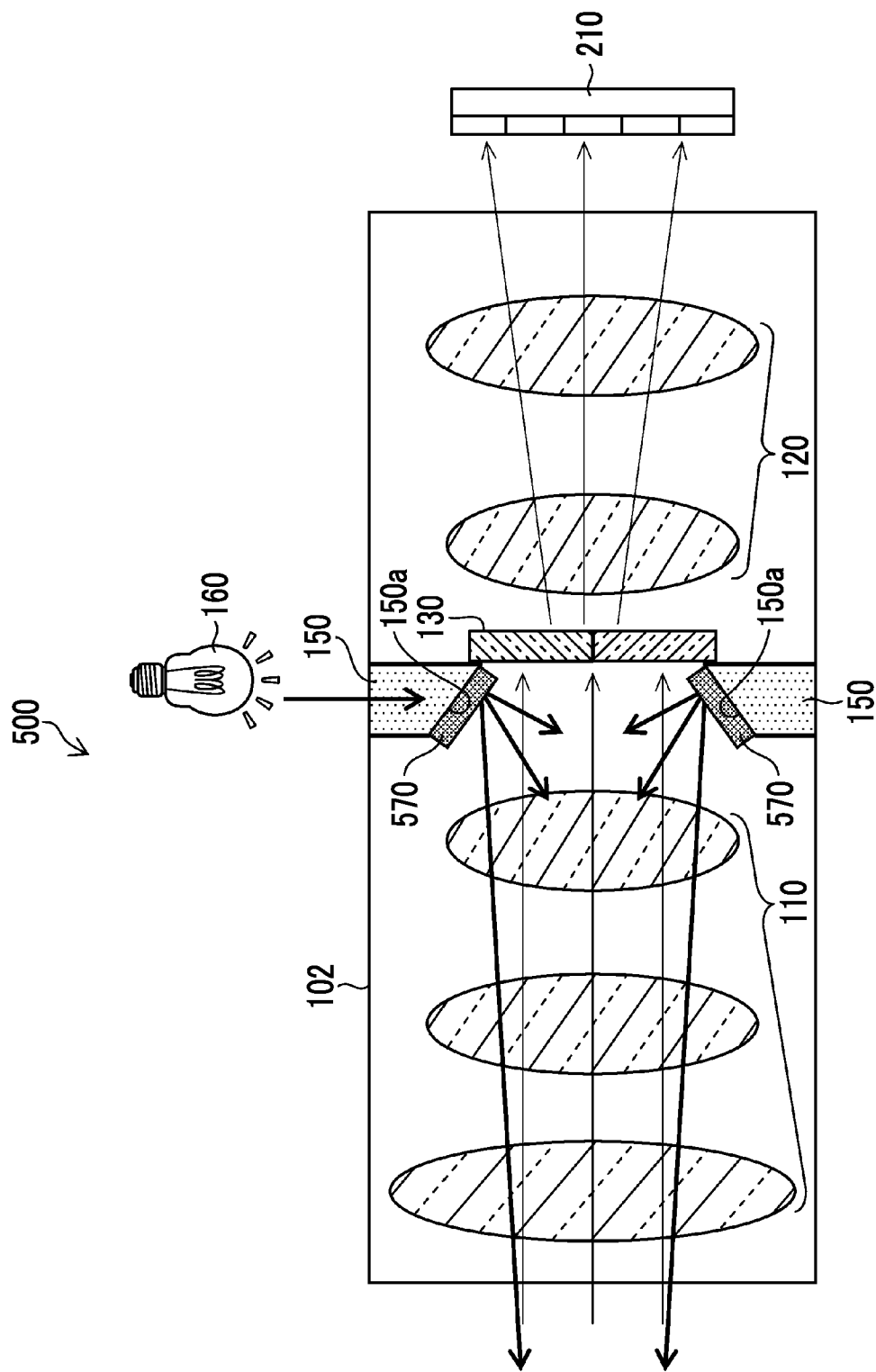
FIG. 19 is a diagram showing the schematic configuration of a lens device according to a fourth embodiment.

FIG. 19 is a diagram showing the schematic configuration of a lens device according to a fourth embodiment. The lens device 500 according to the fourth embodiment is different from the embodiments in that a polarizer 570 is provided on an end surface 150a of a second optical member 150 facing an optical axis of an imaging optical system. The configuration of a lens device comprising a polarizer is not limited to the lens device shown in FIG. 19 (in which the lens device 100 according to the first embodiment is provided with a polarizer), and may be a configuration in which the second optical member of the lens device according to the other embodiment is provided with a polarizer.

Since the polarizer 570 is provided on the end surface 150a of the second optical member 150 facing the optical axis of the imaging optical system, illumination light can be polarized. The polarization direction of the specular reflection of illumination light applied to a subject is maintained. For this reason, since total reflection occurs in the first optical member 130 in a case where a subject is irradiated with illumination light not polarized, it is difficult to perform interference removal due to overexposure. Since illumination light passes through the polarizer 570 in a case where illumination light passes through the second optical member, totally reflected light can be cut off and overexposure can be reduced. A publicly known polarizer can be used as the polarizer.

Fifth Embodiment

Figure 20:
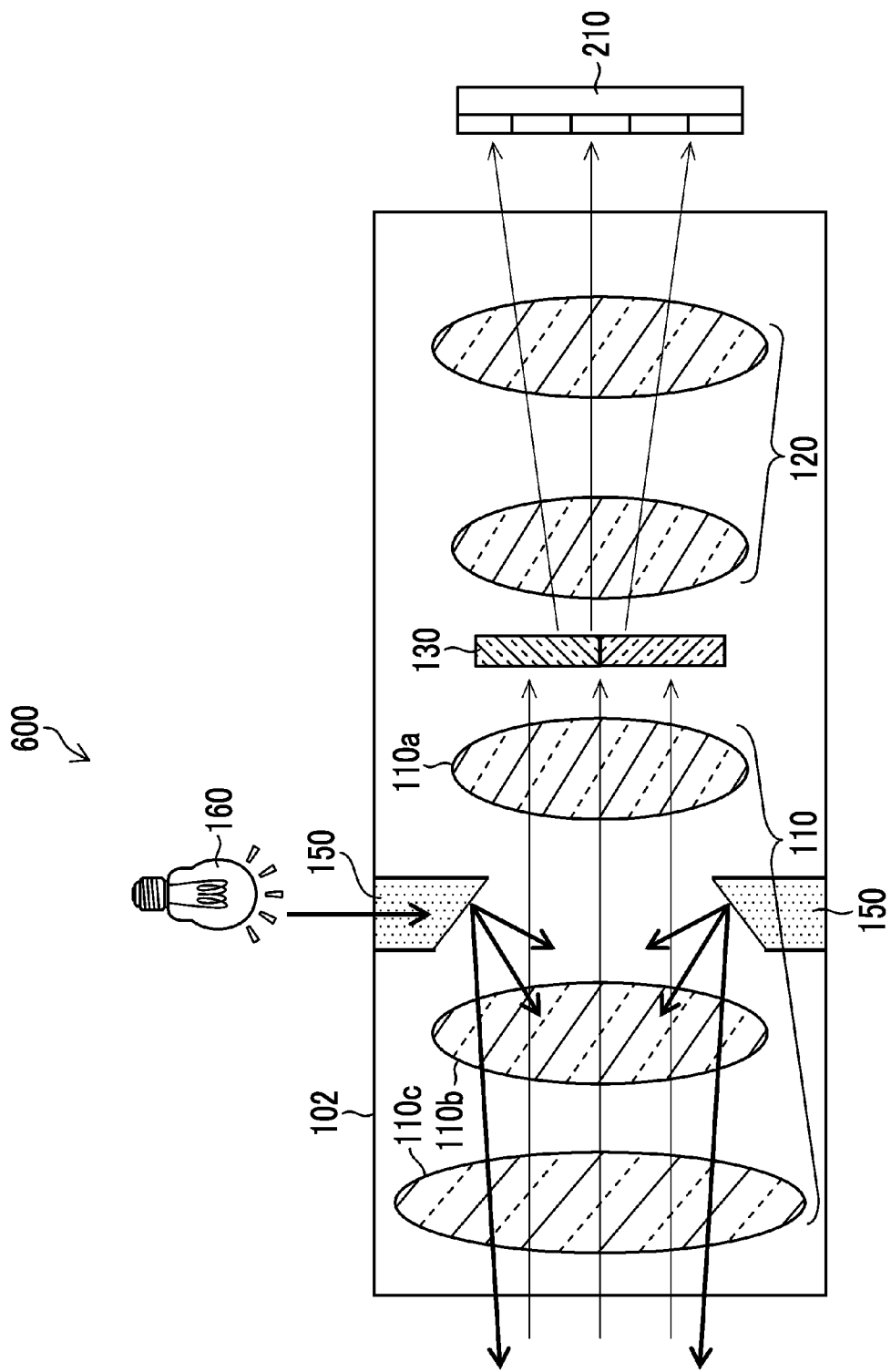
FIG. 20 is a diagram showing the schematic configuration of a lens device according to a fifth embodiment.

FIG. 20 is a diagram showing the schematic configuration of a lens device according to a fifth embodiment. The lens device 600 according to the fifth embodiment is different from the lens devices according to the embodiments in that a second optical member 150 is disposed between lenses 110a and 110b among a plurality of lenses 110a, 110b, and 110c forming a first lens 110.

The position of the second optical member 150 is not limited to the frame 132 of the first optical member 130. As long as the second optical member 150 is closer to the subject side than the first optical member 130, illumination light does not pass through the first optical member 130 and illumination coaxial with the imaging optical system can be provided. Accordingly, light reflected from a subject can be efficiently taken in by the first optical member 130, an image having a good image quality can be acquired, and the same effects as the embodiments can be obtained. The second optical member 150 is disposed on the subject side from the first optical member 130 with one lens 110a interposed therebetween in FIG. 20, but may be disposed with two or more lenses interposed therebetween. According to the lens device 600 of the fifth embodiment, it is effective in a case where an interval between lenses at a pupil position (near the pupil) is small and the second optical member 150 cannot be disposed.

EXPLANATION OF REFERENCES

10: imaging apparatus
100, 300, 400, 500, 600: lens device
102: lens barrel
104: first lever
106: second lever
108: slit
110: first lens
110a, 110b, 110c: lens
120: second lens
130: first optical member
131, 132: frame 131A, 131B, 131C, 131D, 132A, 132B, 132C, 132D: aperture region
131E, 139, 139A, 139B, 139C, 139D: shielding member
140, 140A, 140B, 140C, 140D: filter set
142A, 142B, 142C, 142D: optical filter
144A, 144B, 144C, 144D: polarizing filter
146A, 146B, 146D: dark filter
150, 152, 450: second optical member
150a, 152a, 450a: end surface
150b: side surface
160, 460: illumination device
200: imaging apparatus body
210: imaging element
211: pixel array layer
212: photodiode
213: polarizing filter element-array layer
214A, 214B, 214C, 214D: polarizing filter element
215: microlens array layer
216: microlens
230: signal processing unit
232: analog signal processing unit
234: image generation unit
236: coefficient storage unit
360: ring illumination
362: mirror
450: second optical member
462: arrow
570: polarizer
L: optical axis

What is claimed is:

1. A lens device comprising:
an optical system that includes a lens forming an optical image of a subject;
a first optical member that is disposed at a pupil position of the optical system or near the pupil position and includes a plurality of aperture regions, a plurality of optical filters that are disposed in the plurality of aperture regions and include two or more optical filters transmitting lights having at least some wavelength ranges different from each other, and a plurality of polarizing filters that are disposed in the plurality of aperture regions and have different polarization directions; and
a second optical member that is provided outside the optical system and closer to a subject side than the first optical member, and diffuses and emits illumination light, which is incident from the outside of the optical system, to the subject side via the optical system,
wherein the second optical member is a diffusion plate.

2. The lens device according to claim 1,
wherein an end surface of the second optical member facing an optical axis of the optical system is inclined in a direction widening toward the subject side.

3. The lens device according to claim 1,
wherein an end surface of the second optical member facing an optical axis of the optical system has a curvature.

4. The lens device according to claim 1,
wherein the second optical member is coaxial with an optical axis of the optical system and at least a part of the second optical member surrounds an outer periphery of the first optical member, or
a plurality of the second optical members are provided on a circumference about the optical axis.

5. The lens device according to claim 1,
wherein the first optical member includes a frame that forms the plurality of aperture regions, and
the second optical member is provided on the frame.

6. The lens device according to claim 1,
wherein the second optical member is disposed from the first optical member with at least one or more lenses interposed therebetween.

7. The lens device according to claim 1, further comprising:
an illumination device that emits the illumination light,
wherein the illumination light is emitted to the second optical member from the outside of the optical system.

8. The lens device according to claim 7,
wherein the illumination device is a ring illumination disposed outside the optical system, and
illumination light emitted from the ring illumination is incident on the second optical member via a mirror.

9. The lens device according to claim 1, further comprising:
an illumination device that emits the illumination light,
wherein the illumination device is disposed in a lens barrel in which the optical system is disposed.

10. The lens device according to claim 9,
wherein the illumination device is provided on an optical path of the lens.

11. The lens device according to claim 1,
wherein a polarizer is provided on an end surface of the second optical member facing an optical axis of the optical system.

12. The lens device according to claim 1,
wherein the second optical member is provided such that an inclination angle of the second optical member is changeable in a vertical direction and a lateral direction.

13. An imaging apparatus comprising:
the lens device according to claim 1;
an imaging element that includes a plurality of polarizing elements having different polarization directions and a plurality of pixel groups selectively receiving light transmitted through any one of the plurality of aperture regions; and
a processor that generates a plurality of images corresponding to the wavelength ranges of the plurality of optical filters, respectively, on the basis of a plurality of image signals output from the imaging element.

* * * * *